United States Patent
Kaftory

(10) Patent No.: US 9,336,452 B2
(45) Date of Patent: May 10, 2016

(54) SYSTEM AND METHOD FOR IDENTIFICATION OF PRINTED MATTER IN AN IMAGE

(75) Inventor: Ran Kaftory, Kiryat Tivon (IL)

(73) Assignee: EYECUE VISION TECHNOLOGIES LTD., Yokneam-Ilite (IL)

( * ) Notice: Subject to any disclaimer, the term of this patent is extended or adjusted under 35 U.S.C. 154(b) by 199 days.

(21) Appl. No.: 13/979,671

(22) PCT Filed: Jan. 16, 2012

(86) PCT No.: PCT/IL2012/000023
§ 371 (c)(1),
(2), (4) Date: Jul. 15, 2013

(87) PCT Pub. No.: WO2012/095846
PCT Pub. Date: Jul. 19, 2012

(65) Prior Publication Data
US 2013/0294700 A1    Nov. 7, 2013

Related U.S. Application Data

(60) Provisional application No. 61/433,230, filed on Jan. 16, 2011.

(51) Int. Cl.
*G06K 9/00*   (2006.01)
*G06K 9/46*   (2006.01)
*G06K 9/32*   (2006.01)

(52) U.S. Cl.
CPC ............. *G06K 9/46* (2013.01); *G06K 9/3241* (2013.01); *G06K 9/3275* (2013.01)

(58) Field of Classification Search
None
See application file for complete search history.

(56) References Cited

U.S. PATENT DOCUMENTS

| | | | |
|---|---|---|---|
| 5,168,531 A | 12/1992 | Sigel | |
| 5,687,333 A | 11/1997 | Dobashi | |
| 5,900,863 A | 5/1999 | Numazaki | |
| 6,115,482 A | 9/2000 | Sears | |
| 6,466,205 B2 | 10/2002 | Simpson | |
| 7,389,002 B1* | 6/2008 | Knight | 382/294 |
| 8,126,264 B2* | 2/2012 | Kaftory et al. | 382/165 |
| 8,144,121 B2 | 3/2012 | Kitaura | |
| 8,482,534 B2 | 7/2013 | Pryor | |
| 8,576,199 B1 | 11/2013 | Pryor | |
| 2002/0114491 A1* | 8/2002 | Sharma | G06T 1/0071 382/100 |
| 2005/0244072 A1* | 11/2005 | Imai | 382/254 |
| 2006/0056732 A1 | 3/2006 | Holmes | |
| 2007/0016790 A1 | 1/2007 | Brundage et al. | |
| 2007/0019808 A1* | 1/2007 | Gonzalez | 380/51 |
| 2007/0158434 A1 | 7/2007 | Fan | |
| 2008/0260244 A1 | 10/2008 | Kaftory | |
| 2008/0284864 A1 | 11/2008 | Kotake | |
| 2009/0057400 A1 | 3/2009 | Silverbrook et al. | |

(Continued)

OTHER PUBLICATIONS

Office Action of U.S. Appl. No. 14/840,068 mailed Feb. 11, 2016.

*Primary Examiner* — Aaron W Carter
(74) *Attorney, Agent, or Firm* — Pearl Cohen Zedek Latzer Baratz LLP

(57) ABSTRACT

A system and method of identifying a printed matter in an image that includes the printed matter by rectifying the image, identifying a series of pre-defined areas in the image relative to a frame or other form in the printed matter in the image, and comparing a characteristic of the pre-defined area in the printed matter in the image, to a characteristic of a corresponding pre-defined area from a sample of printed matters.

12 Claims, 4 Drawing Sheets

(56) References Cited

U.S. PATENT DOCUMENTS

| | | |
|---|---|---|
| 2009/0110239 A1 | 4/2009 | Chen |
| 2009/0152357 A1* | 6/2009 | Lei .................. G06F 17/30011 235/454 |
| 2009/0154778 A1* | 6/2009 | Lei .................... G06K 9/00456 382/112 |
| 2010/0103132 A1 | 4/2010 | Ikeda |
| 2011/0298922 A1 | 12/2011 | Horovitz |
| 2012/0056992 A1 | 3/2012 | Kuroda |
| 2012/0199066 A1* | 8/2012 | Hoshino ....................... 118/706 |
| 2012/0249741 A1 | 10/2012 | Maciocci |
| 2012/0299876 A1 | 11/2012 | De Leon |
| 2013/0110804 A1 | 5/2013 | Davis |
| 2013/0113888 A1 | 5/2013 | Koguchi |
| 2013/0294700 A1* | 11/2013 | Kaftory ....................... 382/195 |
| 2014/0320668 A1 | 10/2014 | Kalevo |
| 2015/0117789 A1* | 4/2015 | Miyashita ..................... 382/201 |
| 2015/0371103 A1* | 12/2015 | Kaftory ................ G06K 9/3275 382/195 |

\* cited by examiner

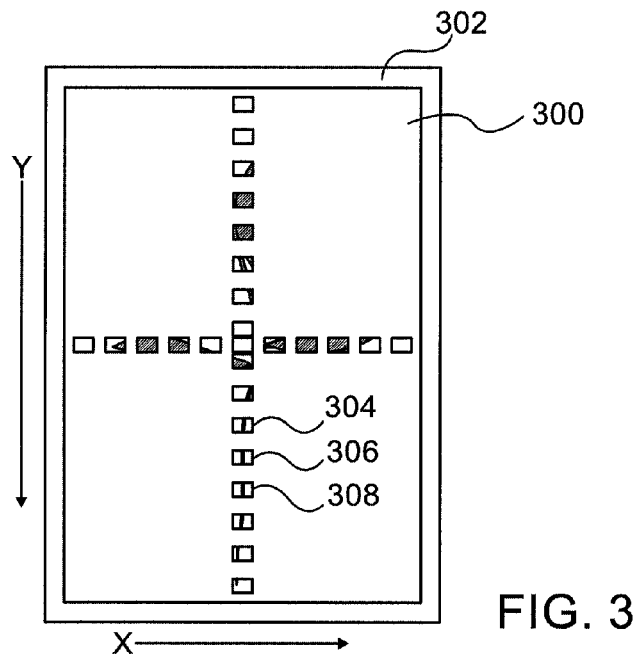
FIG. 3
| POINTS | VALUES |
|---|---|
| 304 | 165789 |
| 306 | 30487 |
| 308 | 81452 |
| SUM | 127728 |
FIG. 4
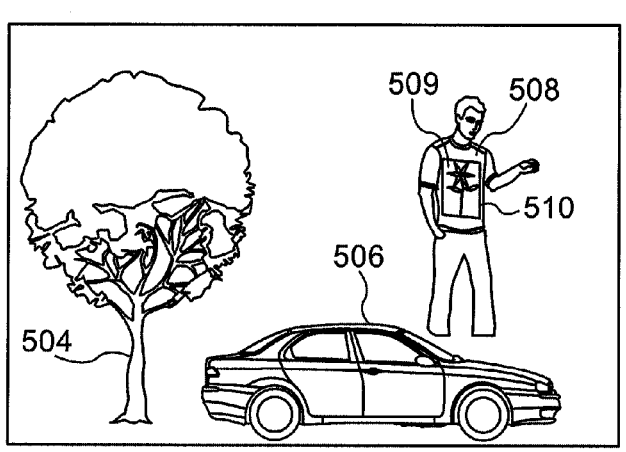
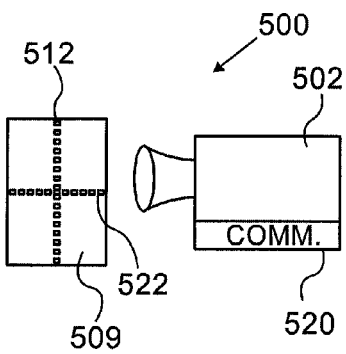
FIG. 5

SYSTEM AND METHOD FOR IDENTIFICATION OF PRINTED MATTER IN AN IMAGE

CROSS-REFERENCE TO RELATED APPLICATIONS

This application is a National Phase Application of PCT International Application No. PCT/IL2012/000023, International Filing Date Jan. 16, 2012, claiming priority of US Patent Application No. 61/433,230, filed Jan. 16, 2011, all of which are hereby incorporated by reference.

FIELD OF THE INVENTION

This application relates to computer vision, and particularly to detecting and identifying printed matter in an image of such printed matter.

BACKGROUND

Bar codes, 2D codes or similar symbols may be added to printed items so that the printed item such as a consumer good in a store may be identified by optical means. Printing bar codes, finding the code on an item and obtaining the special equipment required to read the bar code adds cost and burden to the process of identifying printed items.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

FIG. 3 is a representation of markings or characteristics of a line or set of points overlaid on the printed area of the printed matter, in accordance with an embodiment of the invention;

FIG. 4 is a set of digitized values representing characteristics of sets of points, and a sum of such values, in accordance with an embodiment of the invention;

FIG. 5 is a conceptual diagram of an image of a printed matter having a reference frame, in accordance with an embodiment of the invention;

DETAILED DESCRIPTION OF THE PREFERRED EMBODIMENTS

Figure 1:
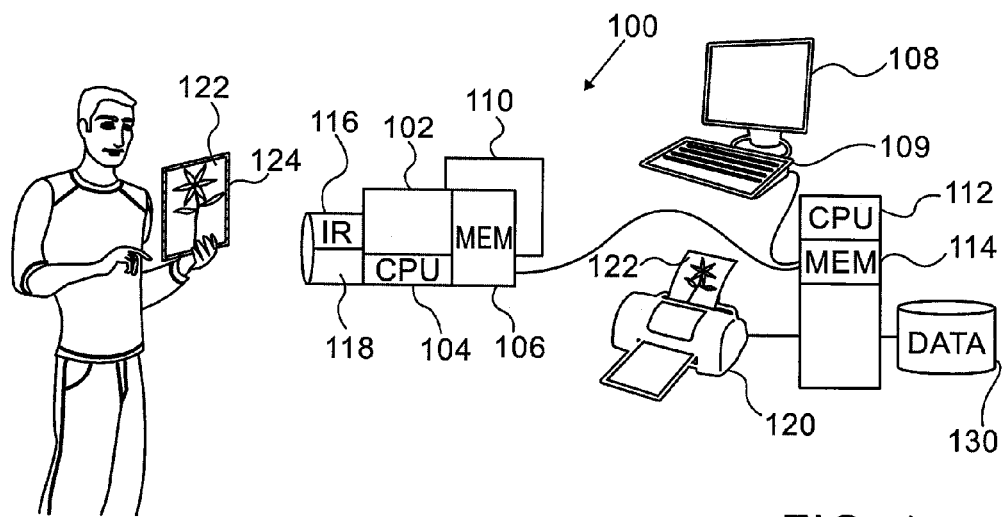
FIG. 1 is a schematic diagram of components of a system, in accordance with an embodiment of the invention.

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "selecting," "evaluating," "processing," "computing," "calculating," "associating," "determining," "designating," "allocating" or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

As used in this application and in addition to its regular meaning, the term "printed matter" may refer to any object that has been printed on. For example, printed matter may include paper, newspaper, cardboard, poster paper, trading card or a book page upon which there has been printed words, pictures or colors. Other printed matter may include cloth such as t-shirts or clothing, packaging such as boxes, jars, cans, drums or containers, and decorative items such as wallpaper, furniture or other items. The results or appearance of a printing on a printed matter may be known so that a color, words, markings or other appearance of designated points, areas or coordinates on the printed matter may be known and calculable from an observation or analysis of the printed object or from a raster of a print plan. For example, a printed matter may include a playing card such as a king of diamonds. By studying or plotting the printed design on the card or in a raster of a card, a record may be made of the colors, letters or other markings on particular points on the card. For example an imaginary line from the top to the bottom of a center of a card may intersect or pass through a series of various colors, letters or other markings. It may be assumed that an imaginary line at the same location on another king of diamonds playing card that has been printed with the same or similar design or printing plate will have identical or substantially similar colors, letters or other markings. It may similarly be assumed that colors, letters or other markings found on one or more points represented by for example x and y coordinates on a first king of diamonds card, will be substantially the same as such colors, letters or other markings found on the same coordinates of other king of diamond cards that are printed from the same plate or set up. Corresponding coordinates of or predefined locations on a printed matter that are printed from the same plate or printing run should therefore bear the same colors, letters, characteristics or markings.

The processes and functions presented herein are not inherently related to any particular computer, network or other apparatus. Embodiments of the invention described herein are not described with reference to any particular programming language, machine code, etc. An embodiment of the invention may be practiced through the execution of instructions such as software that may be stored on an article such as a disc, memory device or other mass data storage article. Such instructions may be for example loaded into a processor and executed on one or more computerized platforms. It will also be appreciated that while embodiments of the current invention are primarily described in the form of methods and devices, the invention may also be embodied, at least in part, in a computer program product as well as a system comprising a computer processor and a memory coupled to the processor, wherein the memory is encoded with one or more programs that may perform the functions disclosed herein.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. Processes to be executed by a processor or stored by a memory may be executed by one or more processors or stored on more than one memory units in more than one places.

As used in this application and in addition to its regular meaning, the term "image of a printed matter" may refer to a picture such as a photograph or other captured image of a printed matter. For example, in the case of a t-shirt printed with a flower on the front, the printed matter may include the part of the t-shirt having the printed flower or other printed content. A photograph or image that is captured of the t-shirt may be deemed an image of a printed matter. The image of the printed matter may of course be of a different size than that of the printed matter itself, and may show the printed matter with varying brightness, shading or other visual characteristics.

As used in this application and in addition to their regular meanings, the terms points, areas or coordinates may refer to an identifiable area or section of a printed matter or image of a printed matter that may be identified, found, located or designated by reference to the placement of such point along one or more axis, shapes, forms or known locations relative to the printed matter. For example, a vertical or long side of a playing card may be deemed a y axis and a horizontal or short side of a playing card may be deemed an x axis. If each axis is marked or virtually, designated with for example millimeter increments, a point on the card having coordinates (x=12, y=54) may refer to the end of king's nose on all cards printed from a same plate or printing run. In a rectified image of the printed matter, the measures of the increments of coordinates may be interpolated to account for a different size of the image of the printed matter, but the corresponding interpolated coordinate will still refer to the same point on the king's nose. In some embodiments, one or more axis, reference points or recognizable shapes may be included in or around or may for example surround a printed area of a printed matter. In some embodiments, at least 4 points or shapes may provide enough reference points from which to create coordinates of points in the image of the printed matter. Though triangulation of coordinates may also be possible. For example, a printed area may be surrounded by a frame, a set of lines, points, forms or other patterns whose distance and placement is known relative to the printed area of the printed matter and to each point in such printed area. Such a frame, set of points, lines or forms may be used as one or more axis by which coordinates of points of the printed area may be denominated or designated.

Reference is made to FIG. 1, a schematic diagram of components of a system, in accordance with an embodiment of the invention. System 100 may include for example an imager 102 such as a camera, IR detector, video camera or other image capture device. Imager 102 may be connected to or otherwise associated with a memory 106. System 100 may include a processor 104, such as a central processing unit or other processor 112 suitable to process for example image data. Memory 106 and memory 114 may include random access memory or other mass data storage capacity that may be suitable to record and store data such as image data captured by imager 102 or other data such as data about as well as software or instructions that may be executed by processor 104. System 100 may include an input device 109 such as a keyboard, touch pad, mouse or other device suitable for inputting a signaling for the execution of a function by for example processor 104 or 112. System 100 may include an output device 108 such as a screen, a loudspeaker or other producer of a signal that may be detected by for example a user. System 100 may also include a communication module 110 that may transmit or receive signals or data to and from a remote processor 112 or remote memory 114. Data about numerous printed matters may be stored in a data base 130 that may be associated with memory 114. System 100 may include a printer 120 that is suitable to print a printed matter such as, a page 122 that includes words, a graphic or other printed matter.

Imager 102 may be suitable to capture an image that includes for example items such as a person, or other items, and a printed matter such as a page 122.

In some embodiments, imager 102 may include both an IR sensor 116 and a standard color image detector 118. The IR sensor 116 may capture an image of non-visible elements such as in some embodiments a frame 124 or reference points in or around a printed matter in an image, while standard image capture sensors may capture a rest of an image. This may allow a frame 124 or reference point in an image to be invisible to users but still be used in a method of an embodiment of the invention.

Figure 2:
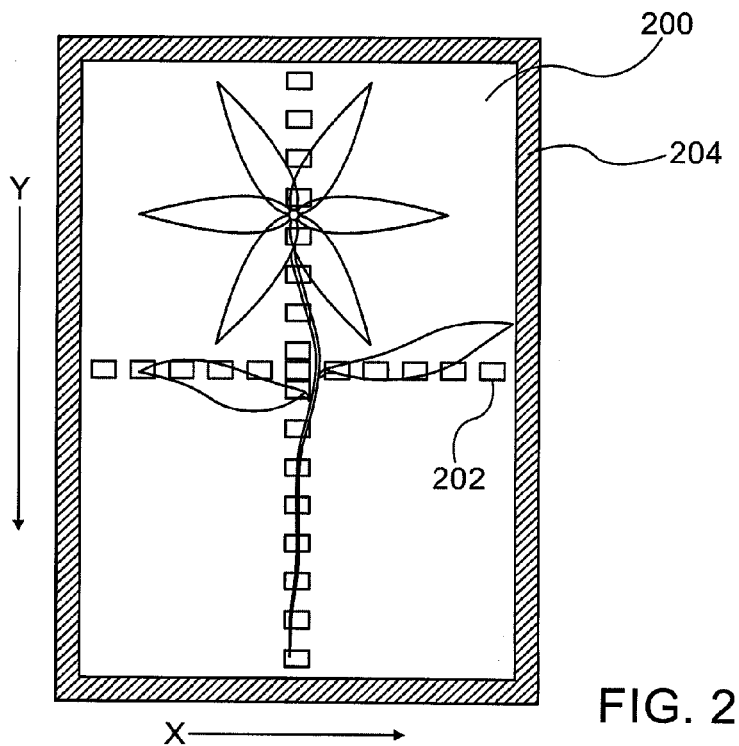
FIG. 2 is a schematic diagram of designated points in a printed matter, in accordance with an embodiment of the invention.

Reference is made to FIG. 2, a schematic diagram of designated points in a printed matter, in accordance with an embodiment of the invention. For example, a picture of a flower may be printed on a card or other printed matter 200. In operation, memory 106 may store data about a characteristic of several pre-defined points, areas 202, coordinates or locations of a printed matter 200. For example, an imaginary vertical line of points or pre-defined areas 202 may be imposed or overlaid over a center or other area of the card. An imaginary horizontal line of points or areas 202 may likewise be imposed or overlaid over a center or other area of a card or printed matter 200. Other shapes, lines or forms may be included in or around the printed matter 200 to serve as reference points for establishing coordinates for areas 202 in an image of the printed matter 200. Each of such points or areas 202 may be designated by a unique pair or set of x,y coordinates that may form a virtual grid, relative to for example a visible or invisible frame, lines, reference points 204 or other markings whose position relative to the printed area is known.

Reference is made to FIG. 3, a representation of markings or characteristics of an isolated line of points or set of points overlaid on the printed area of the printed matter, in accordance with an embodiment of the invention. For example, a first point 304 with coordinates x=5,y=11, may be associated with a white or blank area, a second point 306 with coordinates x=6, y=11 may be associated with a yellow mark, and a third point 308 with coordinates x=7, y=11 may be associated with a black mark. Other characteristics such as hue, brightness, etc may also be detected, stored and associated with the designated points or areas 304. Data or characteristics about each of a set of points 304 in a printed area of a printed matter 300 may be collected and stored in for example a memory, where one, some or all of such points are associated with location coordinates relative to the axis. A collection of data about a fairly small number of such points (such as between 100 and 200 points), may create a unique identifier to a particular printed matter 200, given the unlikelihood that two different printed matters 200 will have corresponding coordinate points with the same color or marking characteristics.

Reference is made to FIG. 4, a mathematical sum of digitized values representing characteristics of sets of points or areas, in accordance with an embodiment of the invention. In some embodiments, various characteristics of colors or markings of points 304, 306, and 308 may be associated with digital values. These values may be functions of hues, brightness or other identifiable characteristics of the points, and the placement or coordinates of such hues, brightness or other characteristics. Some or all of such digital values may be summed or otherwise collected or transformed by a function into a value so that one or a group of for example contiguous points 304, 306 and 308 may be represented by a digital value 400. Such digital value 400 may create a unique identifier of one or more areas or points 304, 306, 308 such as a group of points of the printed matter, or for the entire printed matter since the likelihood of two printed matters having points with the same characteristics in the same locations is very small.

Reference is made to FIG. 5, a conceptual diagram of an image of a printed matter having a reference frame, in accordance with an embodiment of the invention. Image 500 may show a tree 504, a car 506 and a man 508 wearing a t-shirt with a flower printed on the front, where the printed area of the flower is surrounded by a frame 510 of four lines. In some embodiments, the image captured by imager 502 may be rectified. The portion of the image that shows the flower on the t-shirt may be detected by imager 502 by detection of the frame 510 or by other methods, and such portion of the image 500 may be enlarged to allow greater resolution of the area. Detection of the frame 510 or other reference points may allow an overlay onto the printed area of the t-shirt that is within the frame 510 of interpolated coordinates that correspond to the coordinates on the printed matter 122 from FIG. 1. A set of imaginary points 512 may be overlaid on the image of the printed matter 509 in the enlarged portion 509 of the image 500 showing the flower (such points creating for example a horizontal and vertical line through the center of the image of the printed area inside the frame), and the coordinates of each of such points 512 may correspond (after interpolation) to the points 202 from FIG. 2 about which data was collected in the printed matter 122. Characteristics of colors or markings of such points 512 from the image 500 of the printed matter 509 may be collected, and the characteristics of certain of such areas or points 512 may be compared to the characteristics of corresponding points 202 from the printed matter 122. In some embodiments, digitized values of such characteristics of one or more of such points may be compared. A probabilistic model of the comparison may be calculated to determine if the similarly of characteristics of the points 512 in the image 500 of the printed matter 509 to the corresponding areas or points 202 in the printed matter 122 make it likely that the printed matter 509 in the image 500 is a representation of the printed matter 122 about which data is stored in a memory.

In some embodiments, points 512 and areas 202 may be as small as a single pixel of the printed mater 122 or the printed matter 509 in the image 500.

In some embodiments, a series of comparisons may be made between corresponding points 202 in the printed matter 122 on the one hand and the image 500 of the printed matter 509 on the other hand to achieve greater accuracy in identifying an image of printed matter 509 with data stored in a memory of printed matter 122. Such comparisons may be made between, a series of individual corresponding areas, such as for example 202 of FIG. 2 of the printed matter 122 and 522 of the image 500 of the printed matter 509, or between an increasingly or decreasingly large group of corresponding points of the printed matter 122 and the image 500 of the printed matter 509.

In some embodiments, a data base may be assembled that includes characteristics of pre-defined coordinates of numerous printed matters. Such data base may be stored in a memory that is remote from the imager that captures an image of a printed matter. An 502 imager or a communication module 520 with which it is associated may assemble and transmit coordinate data of an image of a printed matter that was captured by an imager, and a processor associated with the remote memory may search the data base to find a printed matter having characteristics of its pre-defined points or areas that are probabilistically similar to the transmitted data about the image of the printed matter. When a probable match is found between the data stored in for example a data base about the printed matter and the data transmitted about the image of the printed matter, an action may be triggered. An action may include, for example, an opening of a web page or an issuance of a signal. For example, if an image of a printed matter showing a candy bar corresponds to stored data about a printed matter showing the candy bar, a web browser associated with the imager may browse to a web page of the company that makes the candy bar. Other functions may be triggered.

In some embodiments, RGB or other color space-based pixel values may be extracted from the predefined set of locations, points, or areas for example, on a predefined grid. These features may be concatenated and correlated against the printed matter features that were stored in the data base. The content which has the best correlation and where the correlation value is above a certain threshold, may be selected as a match.

In some embodiments, pre-processing of the image of the pre-printed matter may be done on a mobile processor, and small packages of digitized data may be transmitted to a remote processor for comparison to a data base of stored coordinate data about printed matter.

In some embodiments a printed matter such as a poster may be used instead of a bar code or 2D code to identify the printed matter in an image to a processor such as processor found in a mobile phone, tablet or other mobile device, and no such bar code or 2D code may be needed on the printed matter in order for a processor to identify the printed matter in an image and to trigger a function.

A frame or reference points that surround the image of the printed matter may be detected for example and in the case of a frame of lines, by extracting pairs of straight lines in the image which are perpendicular and finding their intersection points. Such intersection points may be deemed corners of the frame which form some rectangular shape. To account for perspective transformation in the image that may not be completely rectified, the requirements for detecting corners may be relaxed to not demand an intersection of perpendicular lines, and this restriction may be relaxed to a range of around 90 degrees. In some embodiments, a white or blank frame around a printed portion of a page may be used as a frame or reference point assuming that the white frame stands out against a background in an image of the printed matter.

In some embodiments, a rectification process may include the following. Performing an edge detection operator on the acquired image that includes the printed matter. Such edge detection operator may include for example, a canny edge detection operator or other operators. Such edge detection may not require a global threshold since it may be using a non maximal suppression technique. The result may be one or more binary edges in the image.

Perform a labeling operation on the binary edge image to find connected sets of pixels which form an edge.

Calculate the curvature of edges according to for example the following formula:

$$\text{Curvature} = \text{ArcTan}(dx1, dy1) - \text{ArcTan}(dx2, dy2)$$

$$dx1 = \text{loc}x[\text{edge1}] - \text{loc}x[\text{edge0}]$$

$$dy1 = \text{loc}y[\text{edge1}] - \text{loc}y[\text{edge0}]$$

$$dx2 = \text{loc}x[\text{edge2}] - \text{loc}x[\text{edge1}]$$

$$dy2 = \text{loc}y[\text{edge2}] - \text{loc}y[\text{edge1}]$$

whereas edge0, edge1, edge2 are 3 orderly neighboring pixels from the same edge and locx[edge1] means the X coordinate of such pixel.

Detect straight line segments in the edges by examining parts of the edges that exhibit near zero curvature values.

Calculate slopes of the detected straight lines by using a formula such as the following:

$$\text{Slope} = \text{ArcTan}(x\text{End} - x\text{Start}, y\text{End} - y\text{Start}) \text{ where } x\text{End}, x\text{Start refers to the } X \text{ coordinates of the starting and ending points of the straight line.}$$

Detect pairs of straight lines in which the difference between their slopes is in a specified range around 90 degrees, for example 90°±30°.

Identify corners by calculating the intersection of the above pair of straight lines by using the following formula:

$$(Px, Py) = \left( \frac{(x_1 y_2 - y_1 x_2)(x_3 - x_4) - (x_1 - x_2)(x_3 y_4 - y_3 x_4)}{(x_1 - x_2)(y_3 - y_4) - (y_1 - y_2)(x_3 - x_4)}, \frac{(x_1 y_2 - y_1 x_2)(y_3 - y_4) - (y_1 - y_2)(x_3 y_4 - y_3 x_4)}{(x_1 - x_2)(y_3 - y_4) - (y_1 - y_2)(x_3 - x_4)} \right)$$

where x1, x2 means the X coordinates of the starting and ending points of the $1^{st}$ straight line from the pair and y1, y2 means the Y coordinates of the starting and ending points of the $1^{st}$ straight line from the pair.

where x3, x4 means the X coordinates of the starting and ending points of the $2^{nd}$ straight line from the pair and y3, y4 means the Y coordinates of the starting and ending points of the $2^{nd}$ straight line from the pair. Px, Py are the intersection point coordinates.

Match 4 corners that form a rectangular frame.

Calculate the perspective transformation using these 4 corners.

Rectify the acquired image using the above perspective transformation.

If content of the image of the printed matter consists of text and does not have graphics or a frame that can serve as control points as described above, the content may be rectified by using corners which are identified by for example, the following:

Perform image thresholding to segment the text.

Take the extreme segmented pixels in each row and column and calculate a quadrangle by performing a linear fit to the points.

Finding the location of the corners of the quadrangle using for example the above mentioned method.

Rectify the graphical content as described above.

In an embodiment, a text content may be identified by for example the following:

1. The features of text are the length of one or more words in the image of the printed matter and the spaces between the words. The extraction of these features may be done by for example the following:
    a. Performing image projection to the side by summing up the pixels' intensities horizontally.
    b. Identifying local minima which correspond to text lines in a dark text on bright background, since the result of the projection will exhibit a large sum when summing up bright pixels' intensities along the spaces between lines of text and small sums when summing up dark pixels's intensities along the text itself. If the text is bright on dark background then a local maxima is identified.
    c. Taking a line scan of the above local minima, performing morphological closing (1D) and performing thresholding.
    d. Assigning a value such as 1 to a value above the threshold (which correspond to spaces) and such as −1 to a value below the threshold (which correspond to words).
    e. Concatenating the lines to compose a long feature vector.
2. Correlating the feature vector against the data base of stored printed matter. The text content which has a favorable correlation or for which the correlation value is above a certain threshold, may be selected as a match.

Figure 6:
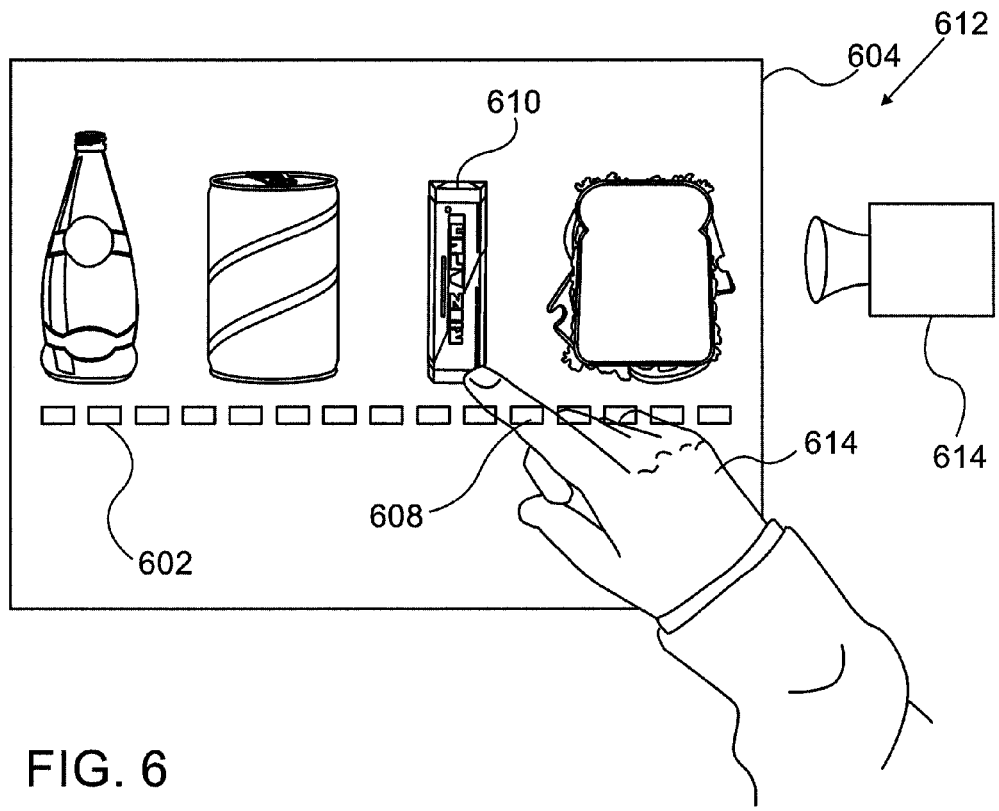
FIG. 6 is a depiction of a user pointing to an element in an image of a printed matter, in accordance with an embodiment of the invention.

Reference is made to FIG. 6, a depiction of a user pointing to an element in an image of a printed matter, in accordance with an embodiment of the invention. In some embodiments, an identification of points 602 in a rectified image 600 of a printed matter 604 that are occluded may be used to identify an item 610 that is being pointed in an image. For example, a database may store characteristics of numerous points or locations of a printed matter 604. For example, such database may store characteristics of locations or points 602 at each squared centimeter of a printed matter, or at some other density. In a captured image 612 of the printed matter 604, characteristics of a similar number and placement of coordinates, points 602 or areas may be captured, analyzed and compared to the corresponding coordinates in the data base of the printed matter 604. If in the captured images 612 someone is pointing to an area of the printed matter in the image, certain of the locations, points 602, coordinates or areas in the image 612 of the printed matter 604 will be occluded or not detected in the image 612 because the finger 614 or other object pointing to the area will cover certain areas of the printed matter 604 in the image 612 that are near or pointing to the selected area. A location of the occluded coordinates, points 602 or locations may be determined, and an estimate of the area being pointed to may be calculated. An imager 614, processor and memory may thereby be suitable to determine an area of a printed matter 604 in an image 612 that is being pointed to or selected by a user.

In some embodiments, a characteristic such a color of a limited number of areas of a printed matter may be stored for purposes of comparison of the printed matter to a printed matter in an image. Once the printed matter in the image is identified, access may be made to a memory that may store information about a greater number of areas of the printed matter so that a determination may be made of a selected item in the image of the printed matter.

In an embodiment, in which an imaging device is used, the process may be as follows:

(i) converting the RGB acquired rectified image to another color space, such as for example, the HSV color space; (ii) comparing the hue and saturation values or some other characteristic of the acquired image of a printed matter with the hue and saturation values stored in the memory for the identified printed matter in the image; (iii) segmenting the difference in hue and saturation by applying a threshold; and (iv) identifying such differences in hue and saturation on graphical objects boundaries that the user may interact with and whose location on the printed matter is stored in the memory. If the difference above the threshold covers a significant portion of the printed matter, it may be marked as a candidate for interaction. An entry point of the hand to the graphical content is detected by finding the region where the difference in hue and saturation is above the threshold on the boundaries of the graphical content. The frontal motion of the finger may be detected by calculating the distance of each difference above the threshold to the entry point of the hand as defined above. The farthest point is then selected. If a candidate object is close to the frontal finger motion, it is marked as used. If an object is identified as used in a few consecutive images, it is marked as selected by the user for interaction.

In some embodiments the content identification may trigger a redirection of an internet browser to a specific website, such as the social network profile of the user or another person. A selection of a desired object from a newspaper, book, advertisement or other poster or printed matter may trigger other responses or actions by a processor or output device. In some embodiments, a placing of a finger or other pointing object and a detection of the occluded areas may be implemented as an input means, in a way that is similar to the functional use of a key board or touch screen, for an electronic device.

In an embodiment, the content identification may trigger a redirection of an internet browser to a specific website, such as a video site which shows video content related to the printed content or a website of a company which is related to a logo or product depicted in the content. In an embodiment, the content identification of the printed matter may trigger an audio visual based animation on a screen.

In an embodiment, the content may be images of trading cards and the identification of a card may be part of a trading card game such as for example Magic: The Gathering™ or Yu-Gi-Oh™ The player may show a card to the camera and the identification of the card will show statistics on a figure in the card or send to another player a signal via a communication network that a character with better stamina was introduced by the first player.

In another embodiment, the content in a new printed matter which is not programmed to be recognized, can be learned "on the fly" and stored in a memory. This may be achieved by detecting that the content in the image is not recognized, and offering the user an opportunity to add the new content to the database of locations and characteristics of the printed matter. A user may be prompted to scan the printed matter or to capture images of various portions of the printed matter, relative to a known item in the printed matter. A processor may store characteristics of the portions of the printed matter and accept an identification of the printed matter. Later captures of images that include the printed matter may be identified based on the inputted data In some embodiments portions of a printed matter may be printed with a non-carbon ink which is invisible to an IR imager, and other portions of the printed matter such as a frame or reference points may be printed with carbon-based ink which is detected as black by IR imagers. When the printed matter is captured in an image, the reference point such as a frame or corner points may be detected by the IR portion of an imager, in for example the following process: Segmenting the rectified image by applying a threshold.

Since the graphical or printed matter is printed with non-carbon ink which is invisible to the IR imager, only the user's hand is seen as a single segment. Identifying such segment on graphical objects boundaries that the user can interact with and whose location is stored in the memory. If the segment covers a significant portion of the graphical object, it is marked as a candidate for interaction. The entry point of the hand to the graphical content may be detected by finding the segment on the boundaries of the graphical content. The frontal motion of the finger may be detected by calculating the distance of each segmented pixel to the entry point of the hand as defined above. The farthest point is then selected. If a candidate object is close to the frontal finger motion it is marked as used. If an object is identified as used in a few consecutive images, it is marked as selected by the user for interaction.

In one embodiment, a toy or a doll with a mounted camera may recognize when a player touches or points to a specific part of a printed image or book page. A system or output device may respond accordingly with an audio feedback related to the touched content, creating a "virtual buttons" experience on any printed matter.

In another embodiment, a camera may recognize a book page by recognizing the text structure in the page as described above and trigger a related audio feedback such as reading the page, adding sound effects, etc.

Figure 7:
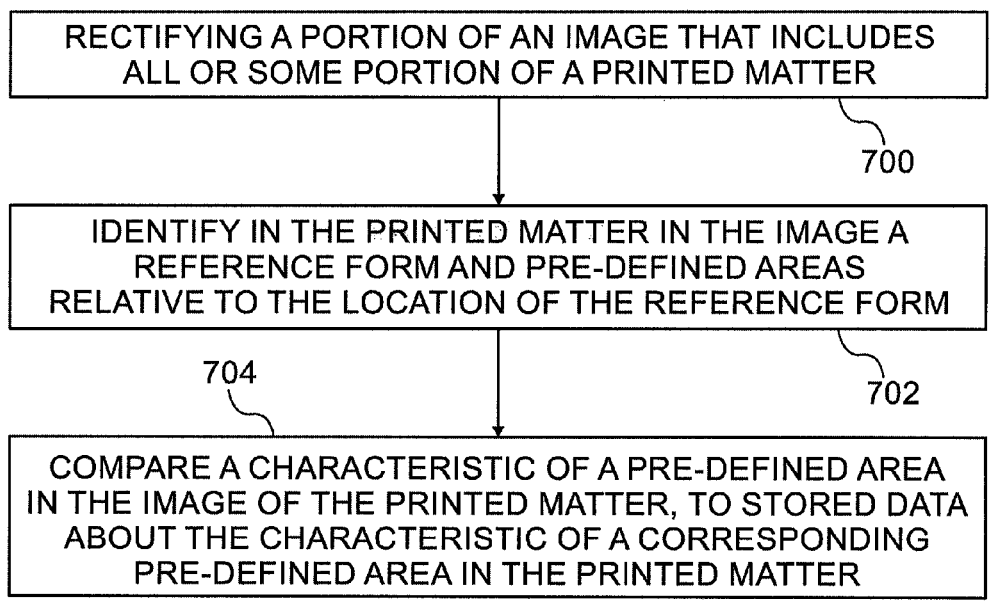
FIG. 7 is a flow diagram of a method in accordance with an embodiment of the invention.

Reference is made to FIG. 7, a flow diagram of a method of identifying a printed matter in an image in accordance with an embodiment of the invention. In some embodiments, a method may include as in block 700 rectifying a portion of an image, where such portion includes all or some portion of a printed matter. The printed matter may appear in the image along with other items that may also appear in the image. In block 702, a method may identify in the printed matter that appears in the image a reference form such as a frame, one or more points or other forms, and may identify one or more known or pre-defined areas in the image of the of printed matter. Such areas may be at known locations or have known coordinates in the printed matter relative to location of the reference printed form in the printed matter. In block 704, an embodiment of a method may compare a characteristic of an identified area or point in the image of the printed matter, to stored data about that same or similar characteristic of a corresponding pre-defined area in the printed matter, where the correspondence is based on the location of the pre-defined area in the printed matter relative to a position or location of the reference form in the printed matter.

In some embodiments, the rectifying may include rectifying a portion of the image of the printed matter that includes the reference form and the pre-defined areas that have known locations relative to the reference form.

In some embodiments, a method may include calculating a probability that the characteristic of one or more pre-defined areas in the printed matter in the image correspond to said stored data about the same characteristic of the pre-defined area in the printed matter. Some embodiments may include comparing characteristics of several points in the image of the printed matter to corresponding points in the printed matter, and calculating a probability that the printed matter in the image is an image of the printed matter.

In some embodiments, comparing a characteristic a pre-defined area in the printed matter in the image may include comparing characteristics in a set of pre-defined areas that create, form, or constitute a shape or pattern of pre-defined areas in the image of the printed matter. Such shape may be a set of areas that create a line or series of lines in the image of the printed matter, such as a vertical and bisecting horizontal line creates by the set of pre-defined areas. The areas in the printed matter may be, form, create or constitute a similar shape so that the areas in the printed matter and in the image of the printed matter create a similar or corresponding shape.

In some embodiments, comparing characteristics of the areas may include comparing a color of one or more pre-defined areas in the image of the printed matter, to stored data about a color of corresponding pre-defined area in the printed matter.

In some embodiments, comparing may include comparing a detected pattern of pre-defined areas of for example a printed page in an image, to stored data about a pattern of pre-defined areas of the printed page. The pattern may include background spaces and non-background spaces that may indicate portions of a line, page or paragraph where there are printed letters, and portions of the line, page or paragraph where there are blanks or no printed letters.

In some embodiments, a method may include calculating a distance or a series of coordinates of a pre-defined area in the captured image from a form such as a frame, line, series of dots or other form that appears the printed matter in the image.

In some embodiments, a method may include comparing a characteristic of a pre-defined area of the printed matter in the image to stored data about characteristic of a pre-defined area in a many samples of printed matters. A comparison may be initiated on a small number of defined areas in an image to a small number of corresponding defined areas in printed matters that may be stored in a data base. As sample from the data base are eliminated for not being similar to the image, the number of pre-defined areas to be compared between the image and the remaining samples in the data base may be increased, thereby increasing the accuracy of the final selection of a printed material that matches a printed matter in an image.

Figure 8:
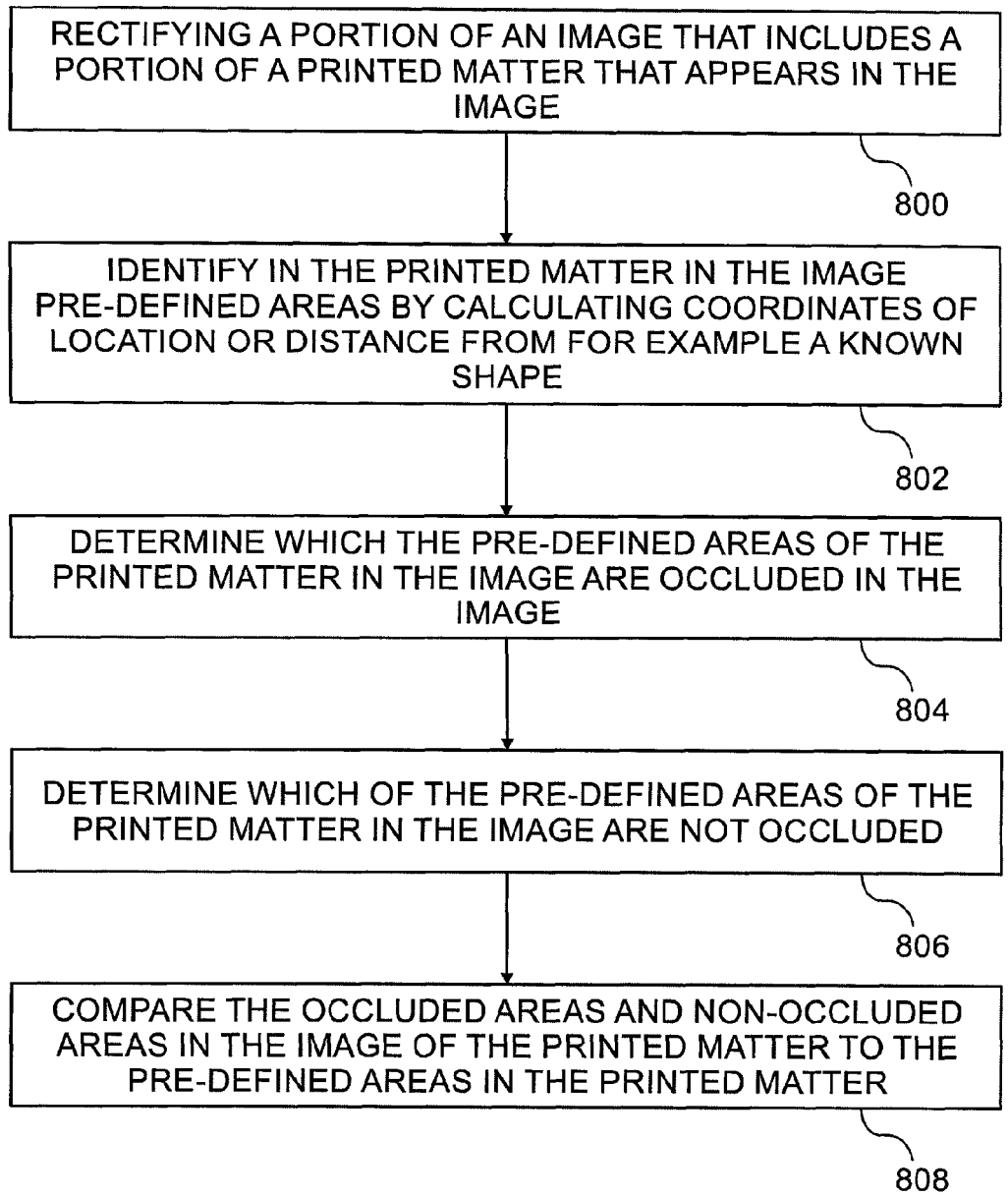
FIG. 8 is a flow diagram of a method in accordance with an embodiment of the invention.

Reference is made to FIG. 8, a flow diagram of a method of identifying a selection of an area of a printed matter in an image. In some embodiments, and as is shown in block 800, a method may include rectifying a portion of an image where such portion includes a first portion of a printed matter that appears in the image. In block 802, a method may identify in the printed matter in the image certain pre-defined areas of the printed matter in the image. Such identification or location may be done by calculating coordinates of location or distance from for example a known shape, form or object appearing in the image of the printed matter. In block 804, a method may identify that some of the pre-defined areas of the printed matter in the image are occluded or covered up in said image. In block 806, a method may identify or determine that certain of the pre-defined areas of the printed matter in the image are not occluded. In block 808, a comparison of the occluded areas and non-occluded areas in the image of the printed matter, may be made to the pre-defined areas in the printed matter.

In some embodiments, a comparison may be made of an image of the pre-defined area of the printed matter that is not occluded in the image to stored data about the pre-defined area of said printed matter.

While certain features of the invention have been illustrated and described herein, many modifications, substitutions, changes and equivalents will now occur to those of ordinary skilled in the art. It is, therefore, to be understood that the appended claims are intended to cover all such modifications and changes as fall within the spirit of the invention.

I claim:

1. A method of identifying a printed matter in an image, comprising:

capturing a first image of a first printed matter, said first printed matter including a first reference form;

storing characteristics of a first plurality of pre-defined areas in said first printed matter in said first image, wherein each area of said first plurality of predefined areas is at a known location relative to said first reference form, capturing a second image, said second image including a second printed matter;

rectifying a portion of said second image, said portion of said second image including at least a first portion of said second printed matter;

identifying in said first portion of said second printed matter in said second image a second reference form and a second plurality of pre-defined areas, each area of said second plurality of pre-defined areas at a known location in said second printed matter relative to said second reference form;

comparing a characteristic of a first pre-defined area of said second plurality of pre-defined areas of said second printed matter in said second image to the stored characteristics of a first pre-defined area of said first plurality of pre-defined areas in said first printed matter in said first image, where the location of said first pre-defined area of said second plurality of pre-defined areas in said second printed matter relative to said second reference form in said second printed matter, corresponds to said location of said first pre-defined area of said first plurality of pre-defined areas in said first printed matter in said first image relative to said first reference form in said first image.

2. The method as in claim 1, wherein said rectifying said portion of said second image comprises rectifying a portion of said second printed matter in said second image that includes said second reference form and said second plurality of pre-defined areas having known locations in said second printed matter relative to said second reference form.

3. The method as in claim 1, comprising calculating a probability that said characteristic of said first pre-defined area of said second plurality of pre-defined areas of said second printed matter in said second image corresponds to said characteristic of said first pre-defined area of said first plurality of pre-defined areas in said first printed matter.

4. The method as in claim 1, wherein said comparing a characteristic of said first pre-defined area of said second plurality of pre-defined areas of said second printed matter in said second image comprises comparing said characteristic of said first pre-defined area of said second plurality of pre-defined areas, said plurality of areas constituting a pre-defined shape in said second printed matter in said second image, to stored data about a characteristic of said first pre-defined area of said first plurality of pre-defined areas constituting said shape in said first printed matter.

5. The method as in claim 1, wherein said comparing said characteristic comprises comparing a color of said first pre-defined area of said second plurality of pre-defined areas of said second printed matter in said second image, to stored data of a color of said first pre-defined area in said first printed matter.

6. The method as in claim 1, wherein said comparing comprises comparing a detected pattern of said second plurality of pre-defined areas of said second printed matter in said second image, to stored data about a pattern of said first plurality of pre-defined areas of said first printed matter, wherein said pattern comprises background spaces and non-background spaces.

7. The method as in claim 1, wherein said identifying in said first portion of said second printed matter appearing in said second image a second plurality of pre-defined areas of said second printed matter appearing in said second image, comprises calculating a distance of said first pre-defined area of said second plurality of pre-defined areas in said second image from said second reference form appearing in said second printed matter in said second image.

8. The method as in claim 1, wherein said comparing comprises comparing a characteristic of said first pre-defined area of said second plurality of pre-defined areas of said second printed matter in said second image to stored data about said characteristic of a pre-defined area in a plurality of printed matters.

9. A system comprising:
   an imager to capture
      a first image, said first image including a first printed matter; and,
      a second image, said second image including a second printed matter,
   a memory to store
      a characteristic of a first point of a first plurality of points in said first printed matter and
      a characteristic of a first point of a second plurality of points in said second printed matter,
   and a processor,
      said processor configured to
         rectify a portion of said second image,
            said portion including said second printed matter;
         calculate a location of said first point of said first plurality of points in said first printed matter relative to a printed form in said first image; and
      to
         calculate a location of said first point of said second plurality of points in said second printed matter relative to a printed form in said second image;
      identify said location of said first point of said first plurality of points with said location of said first point of said second plurality of points; and
      compare said characteristic of said first point of said second plurality of points in said second image to said characteristic of said first point of said first plurality of points in said first image.

10. The system as in claim 9, wherein said processor is configured to calculate a probability that said second printed matter in said second image is an image of said first printed matter.

11. The system as in claim 9, wherein said processor is configured to compare a characteristic of said first point of said second plurality of points in said second printed matter in said second image to stored data about said characteristic of a point in a plurality of printed matters.

12. The method as in claim 1, wherein said second image is captured later than said first image.

* * * * *